(12) United States Patent
Bibby (10) Patent No.: US 11,314,448 B2
(45) Date of Patent: Apr. 26, 2022

(54) REGISTERING STORAGE HOSTS FOR USE IN AUTOMATING SOFTWARE-DEFINED STORAGE DEPLOYMENTS

(71) Applicant: EMC IP Holding Company LLC, Hopkinton, MA (US)

(72) Inventor: Ian D. Bibby, Murrieta, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 61 days.

(21) Appl. No.: 16/938,143

(22) Filed: Jul. 24, 2020

(65) Prior Publication Data
US 2022/0027081 A1 Jan. 27, 2022

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 9,547,485 B2* | 1/2017 | Suzuki | ................ | G06F 9/45558 |
| 10,007,542 B2* | 6/2018 | Hegdal | ............... | G06F 11/1484 |
| 10,574,579 B2 | 2/2020 | Puttagunta et al. | | |
| 10,613,884 B2 | 4/2020 | Koganty et al. | | |
| 2018/0089101 A1 | 3/2018 | Sternberg et al. | | |
| 2019/0243777 A1 | 8/2019 | Sternberg et al. | | |

OTHER PUBLICATIONS

Garcia-Molina et al., Sagas, Proceedings of the 1987 ACM SIGMOD International Conference on Management of Data, Dec. 1987.

* cited by examiner

*Primary Examiner* — Brian R Peugh
(74) *Attorney, Agent, or Firm* — Ryan, Mason & Lewis, LLP (57) ABSTRACT

Methods, apparatus, and processor-readable storage media for registering storage hosts for use in automating software-defined storage deployments are provided herein. An example computer-implemented method includes obtaining information pertaining to parameters for accessing storage hosts over at least one network in connection with at least one software-defined storage deployment; processing one or more requests by one or more client devices to access at least a portion of the storage hosts; registering, based at least in part on the processing of the one or more requests, at least one of the storage hosts by persisting data pertaining to the at least one storage host in connection with at least a portion of the parameters; and performing one or more automated actions related to at least one software-defined storage deployment based at least in part on the registration of the at least one storage host.

20 Claims, 8 Drawing Sheets

REGISTERING STORAGE HOSTS FOR USE IN AUTOMATING SOFTWARE-DEFINED STORAGE DEPLOYMENTS

FIELD

The field relates generally to information processing systems, and more particularly to storage in such systems.

BACKGROUND

Software-defined storage products often use existing servers' local disks in the creation of a server-based storage area network (SAN). As installation and configuration of such products become more complex, the need for managing their deployments has led to the creation of intelligent storage management platforms (ISMPs), which require knowledge of available storage hosts, for example, to deploy components of software-defined storage products onto such hosts. However, conventional storage management approaches typically include performing an arbitrary number of error-prone and resource-intensive steps to prepare storage hosts for the deployment, installation and configuration of a software-defined storage solution.

SUMMARY

Illustrative embodiments of the disclosure provide techniques for registering storage hosts for use in automating software-defined storage deployments. An exemplary computer-implemented method includes obtaining information pertaining to one or more parameters for accessing one or more storage hosts over at least one network in connection with at least one software-defined storage deployment, and processing one or more requests by one or more client devices to access at least a portion of the one or more storage hosts. The method also includes registering, based at least in part on the processing of the one or more requests, at least one of the one or more storage hosts by persisting data pertaining to the at least one storage host in connection with at least a portion of the one or more parameters. Further, the method includes performing one or more automated actions related to at least one software-defined storage deployment based at least in part on the registration of the at least one storage host.

Illustrative embodiments can provide significant advantages relative to conventional storage management approaches. For example, problems associated with error-prone and resource-intensive storage host preparation processes are overcome in one or more embodiments through registering storage hosts by automatically processing client requests and persisting data pertaining to the storage hosts and various access parameters.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
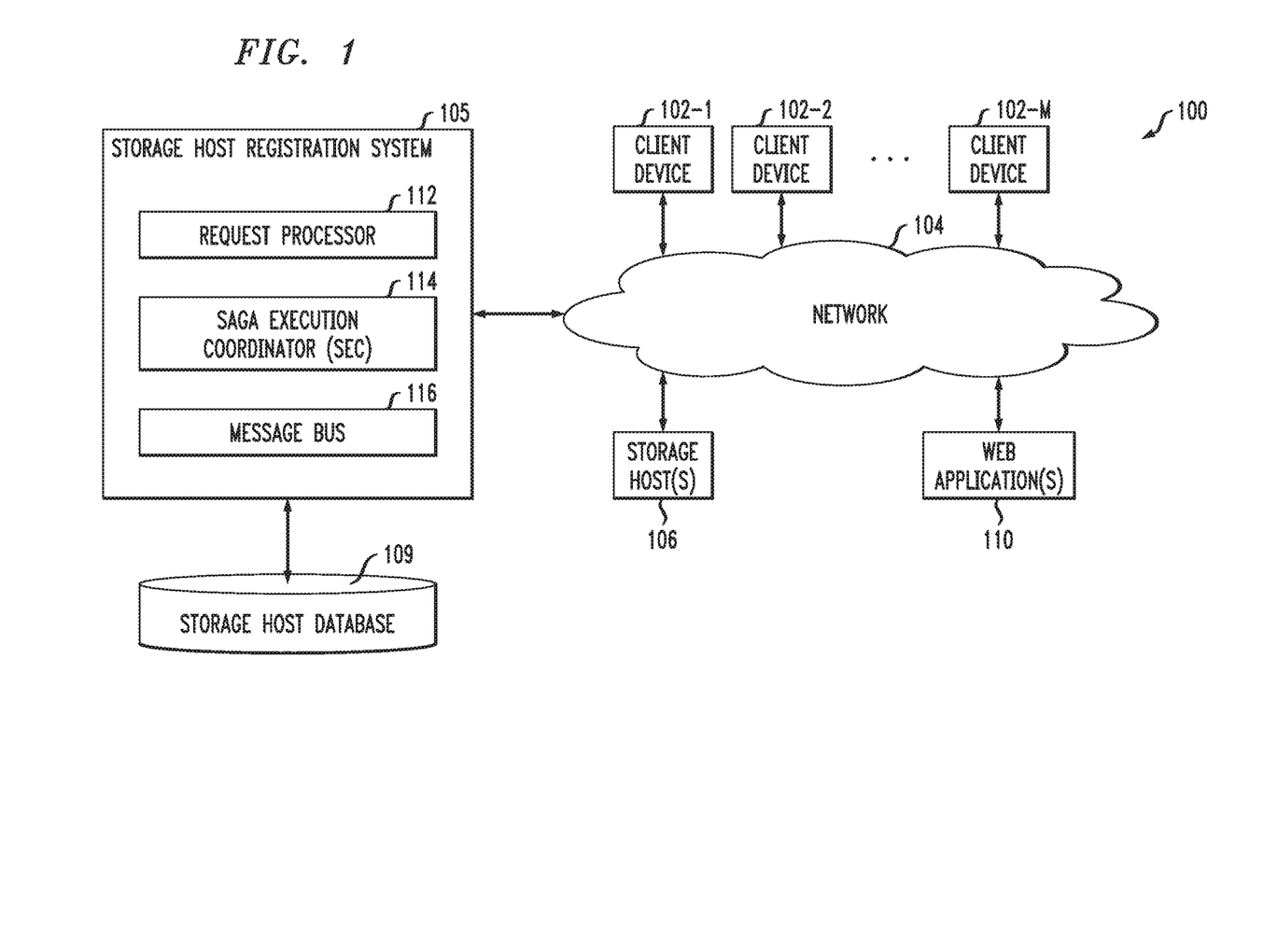
FIG. 1 shows an information processing system configured for registering storage hosts for use in automating software-defined storage deployments in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102 (or simply "clients"). In one or more embodiments, client devices 102 relate to potential storage hosts requesting registration (e.g., in conjunction with and/or distinct from storage host(s) 106). Also, the client devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage host registration system 105, one or more storage hosts 106, and one or more web applications 110 (e.g., applications pertaining to storage deployments, storage monitoring, etc.).

The client devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, storage host registration system 105 can have an associated database 109 configured to store data pertaining to storage hosts, which comprise, for example, various parameters and/or values corresponding thereto for accessing one or more storage hosts over one or more network.

The database 109 in the present embodiment is implemented using one or more storage systems associated with storage host registration system 105. Such storage systems can comprise any of a variety of different types of storage including network-attached storage (NAS), SANs, direct-attached storage (DAS) and distributed DAS, as well as combinations of these and other storage types, including software-defined storage.

Also associated with storage host registration system 105 are one or more input-output devices, which illustratively comprise keyboards, displays or other types of input-output devices in any combination. Such input-output devices can be used, for example, to support one or more user interfaces to storage host registration system 105, as well as to support communication between storage host registration system 105 and other related systems and devices not explicitly shown.

Additionally, storage host registration system 105 in the FIG. 1 embodiment is assumed to be implemented using at least one processing device. Each such processing device generally comprises at least one processor and an associated memory, and implements one or more functional modules for controlling certain features of storage host registration system 105.

More particularly, storage host registration system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memories, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows storage host registration system 105 to communicate over the network 104 with the client devices 102, and illustratively comprises one or more conventional transceivers.

The storage host registration system 105 further comprises a request processor 112, a saga execution coordinator (SEC) 114, and a message bus 116.

It is to be appreciated that this particular arrangement of modules 112, 114, and 116 illustrated in storage host registration system 105 of the FIG. 1 embodiment is presented by way of example only, and alternative arrangements can be used in other embodiments. For example, the functionality associated with modules 112, 114, and 116 in other embodiments can be combined into a single module, or separated across a larger number of modules. As another example, multiple distinct processors can be used to implement different ones of modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for registering storage hosts for use in automating software-defined storage deployments involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of storage host registration system 105, storage host database 109, storage host(s) 106, and web application(s) 110 can be on and/or part of the same processing platform.

An exemplary process utilizing modules 112, 114, and 116 of an example storage host registration system 105 in computer network 100 will be described in more detail with reference to the flow diagram of FIG. 8.

Accordingly, at least one embodiment includes registering storage hosts for use in automating software-defined storage deployments. Such an embodiment includes receiving one or more parameters for accessing a storage host over a network, executing one or more client requests, and persisting data pertaining to the storage host according to the received parameters. Also, by way merely of example, the methods and apparatus of one or more embodiments detailed herein can take the form, at least partially, of program code (i.e., instructions) embodied in an ISMP. Additionally, as used herein, registration relates to the act(s) of providing network-related properties of one or more storage hosts to at least one server application. Such a server application shall perform a set of defined operations to determine if any such storage hosts are to be persisted in a database or not.

As also used herein, a storage host refers to a computer system that may have one or more data storage devices as resources. For example, such resources may include data storage devices such as detailed herein that may be utilized in connection with a software-defined storage solution and/or deployment. In at least one embodiment, multiple data storage systems from one or more different vendors may be connected and may provide common data storage for a software-defined storage solution and/or deployment.

As also used herein, a message bus refers to a software component supporting sending and receiving messages between one or more services within a system. A message bus can facilitate the roles of publishers and/or subscribers. Also, a message, as used herein, refers to a payload of arbitrary data with an intention of being published to or received by a message bus via a subscription. Additionally, a publisher role can include publishing messages associated with a named topic, and a subscriber role can include declaring interest in one or more topics, wherein a message bus can then deliver messages matching the topic(s) accordingly.

In at least one embodiment, a message bus may provide persistence of messages in order to provide at-least-once delivery guarantees. For example, a message bus may persist the interest of a topic for a uniquely-defined subscriber or group of subscribers using a database. When a message is published, the message bus tracks the acknowledgements of the message for each subscription in order to ensure a successful delivery. Also, a message bus may continuously perform delivery of a message until the message bus receives a receipt of acknowledgement from at least one subscriber.

Additionally, as used herein, a command message refers to a message with the semantics of a request and can be intended to invoke an action to be executed by a subscriber. Such a message may or may not result in the publishing of a reply message by a subscriber. Also, in one or more embodiments, a message is typically acknowledged at some point during the message handling to prevent the message bus from attempting redelivery of the message. Further, a reply message refers to a message with the semantics of an absolute event that has already occurred in the past and is therefore considered a matter-of-fact. Such a message can be, for example, the result of a command message and represents the result. As noted above, a reply message is typically acknowledged at some point during the message handling to prevent the message bus from attempting redelivery of the message.

In at least one embodiment, a "saga," as the term is used herein, illustratively represents a high-level single enterprise process such as, for example, the registration of one or more storage hosts. A saga can include one or more low-level requests that are intended to update data within a single operating system process (for example, a row of data specific to a storage host in a database). The arrangement of a saga allows for such updates to occur within multiple local database transactions versus a distributed transaction mechanism such as, for example, a two-phase commit protocol. In an example embodiment, each low-level request can have a matching compensating request that is to be executed when a request fails.

As also used herein, an SEC represents a saga as a finite-state machine containing, for example, the different states of a desired storage host registration process flow. Additionally, an SEC coordinates the execution of requests by publishing command messages onto a message bus, often in response to a reply message or an initial invocation from a client (also referred to herein as a client device) to start a saga.

As further detailed herein, one or more embodiments can include reducing the time required to hold database locks, if any, on one or more database tables and/or rows relevant to an enterprise request being executed. Also, at least one embodiments includes enabling and/or facilitating parallelization of storage host registration processing using a horizontal scale-out system architecture. As further detailed in connection with FIG. 5, there can be multiple subscriber processes that are processing messages from a message bus, and horizontal scalability is achieved by adding additional subscribers to increase throughput and help prevent potential resource exhaustion on the message bus. Additionally, one or more subscribers may act on a specific message type only, and depending on the rate of a message type, the number of such subscribers can be tuned to achieve a desired throughput without having to tune other subscribers or the system as a whole.

Figure 2:
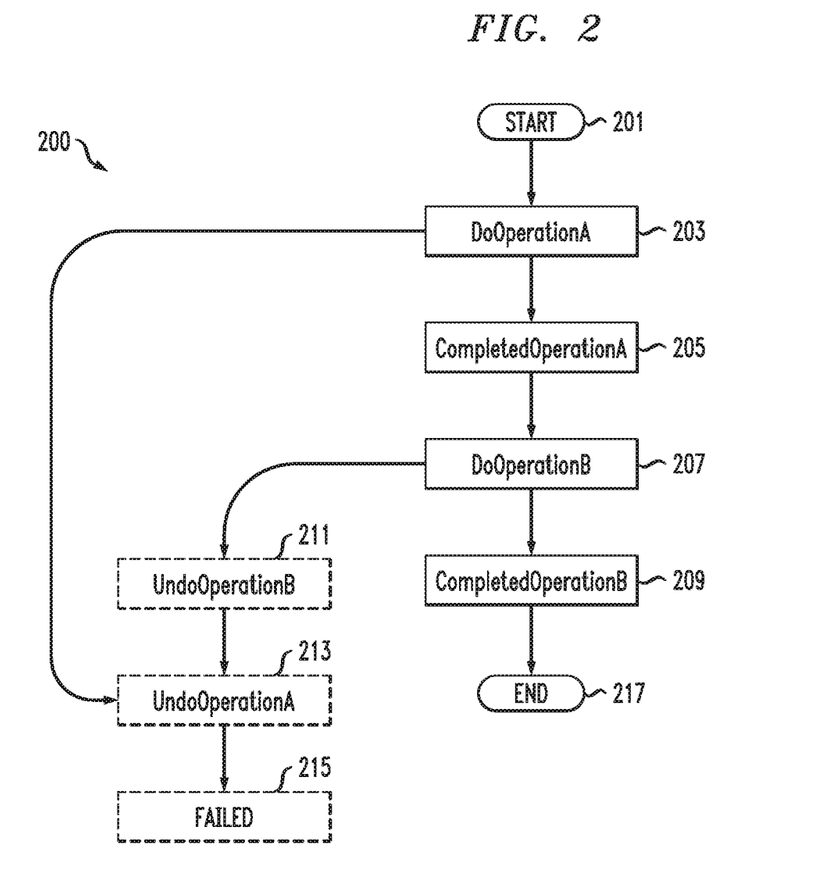
FIG. 2 shows an example directed acyclic graph representing a finite-state machine diagram of an example registration process in an illustrative embodiment.

FIG. 2 shows an example directed acyclic graph representing a finite-state machine diagram of an example registration process in an illustrative embodiment. The finite-state machine 200 is started at step 201 and, in one path, performs OperationA in step 203, notes OperationA as complete in step 205, performs OperationB in step 207, notes OperationB as complete in step 209, and ends the path at step 217. As also depicted in FIG. 2, command messages are represented by step 203 and step 207, with (optional) compensating failure requests noted as step 213 and step 211, respectively (with a failure indication noted in step 215). Reply messages are represented by step 205 and step 209 as successful outcomes to the command messages represented by step 203 and step 207, respectively.

Figure 3:
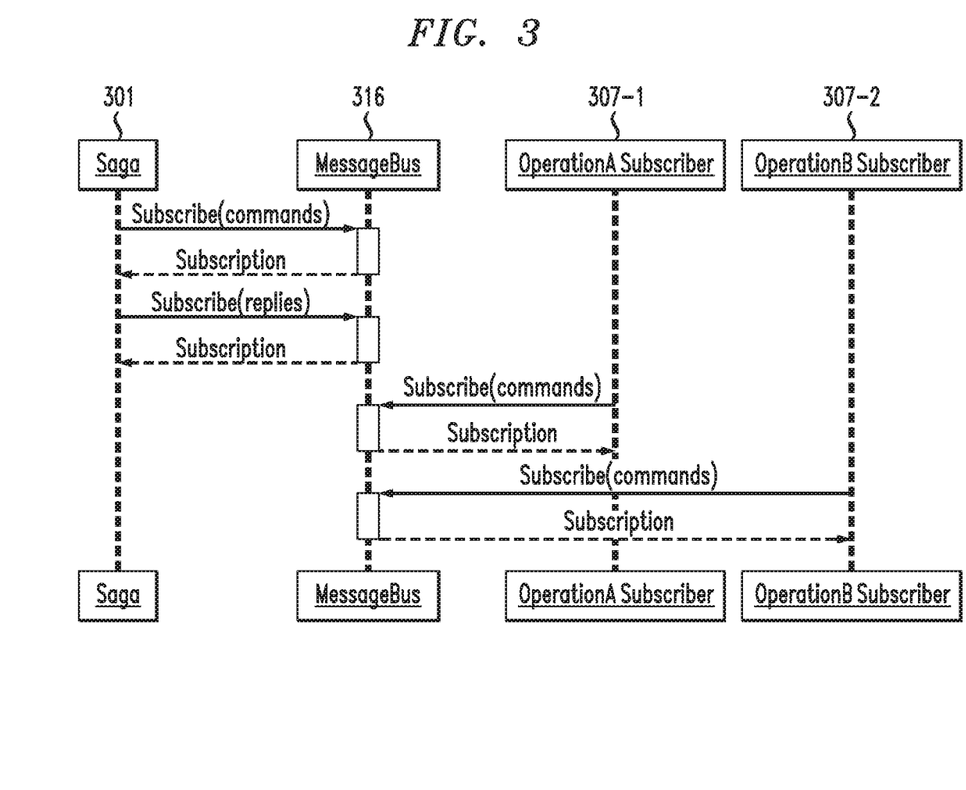
FIG. 3 shows an example sequence representing publishers and subscribers to a message bus in an illustrative embodiment.

FIG. 3 shows an example sequence representing publishers and subscribers to a message bus in an illustrative embodiment. By way of illustration, FIG. 3 depicts a sequence of actions taking place between saga 301, message bus 316, OperationA subscriber 307-1 and OperationB subscriber 307-2. In this example embodiment, command messages are to be published to a topic called "commands" and reply messages are to be published to a topic called "replies."

As specifically depicted in the example embodiment of FIG. 3, saga 301 informs the message bus 316 that it (i.e., saga 301) wants to subscribe to command messages, and the message bus 316 responds to saga 301 with information about the subscription. The saga 301 then informs the message bus 316 that it (i.e., saga 301) wants to subscribe to reply messages, and the message bus 316 responds to saga 301 with information about that subscription. Additionally, as depicted in FIG. 3, OperationASubscriber 307-1 informs the message bus 316 that it (i.e., OperationASubscriber 307-1) wants to subscribe to command messages, and the message bus 316 responds to OperationASubscriber 307-1 with information about the subscription. Further, OperationBSubscriber 307-2 informs the message bus 316 that it (i.e., OperationBSubscriber 307-2) wants to subscribe to command messages, and the message bus 316 responds to OperationBSubscriber 307-2 with information about the subscription.

Figure 4:
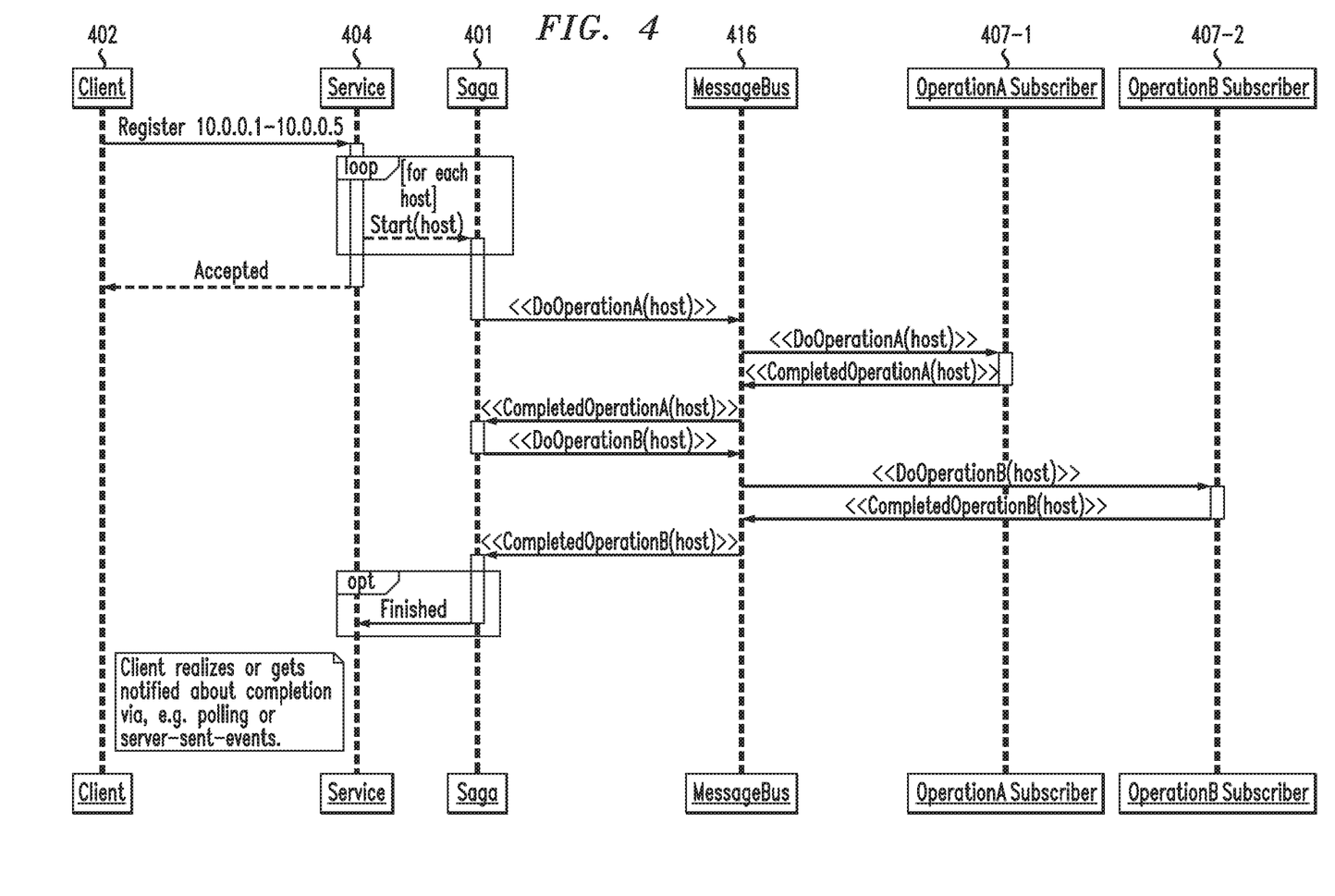
FIG. 4 shows an example sequence representing an implementation of a finite-state machine in an illustrative embodiment.

FIG. 4 shows an example sequence representing an implementation of a finite-state machine in an illustrative embodiment. By way of illustration, FIG. 4 depicts a sequence of actions taking place between client 402, service 404, saga 401, message bus 416, OperationA subscriber 407-1 and OperationB subscriber 407-2. As noted herein, a saga (e.g., saga 401) refers to a component of an overall server product that is specifically responsible for the role of an SEC, while a service component (e.g., service 404) represents all other responsibilities that are outside of the scope of this illustration. For example, a service (e.g., service 404) can include the responsibility of accepting client requests, as a client would not necessarily communicate directly with an SEC. Also, and by way merely of illustration, a subscriber can reside in and/or be a component of a storage host registration system (e.g., system 105 in FIG. 1), proximate to and/or in connection to a message bus (e.g., message bus 116 in FIG. 1). In the context of FIG. 4, by way of further example, depending on the nature of an operation being executed by a subscriber, a subscriber may communicate with a client device (e.g., client 402) and determine its response back to the message bus (e.g., message bus 416) based on the result of the client device communication (e.g., "not enough memory for Host A" for an operation designed to query memory resources from a client device (Host A)).

Referring again to the illustrative embodiment depicted in FIG. 4, an example path is shown in sequence. More specifically, there are two subscribers, 407-1 and 407-2, that have subscribed to the message bus 416 with interest in the command messages "DoOperationA" and "DoOperationB," respectively. The saga 401 would have subscribed to all command and reply messages, thus facilitating the role of an SEC.

As specifically depicted in the example embodiment of FIG. 4, client 402 requests registration of a given IP address range via service 404, and service 404 initiates a saga for each host in the IP address range by requesting saga 401. Subsequently, service 404 responds positively and/or successfully to client 402. As also depicted in FIG. 4, saga 401 publishes a command message to message bus 416 for some "operation A" against a host, and the message bus 416 delivers the command message to OperationASubscriber 407-1. OperationASubscriber 407-1 publishes a reply to message bus 416 based on the outcome of the operation, and message bus 416 delivers the reply message to saga 401.

Additionally, as illustrated in FIG. 4, saga 401 publishes a command message to message bus 416 for some "operation B" against a host, and message bus 416 delivers the command message to OperationBSubscriber 407-2. OperationBSubscriber 407-2 publishes a reply to message bus 416 based on the outcome of the operation, and message bus 416 delivers the reply message to saga 401. Further, as depicted in FIG. 4, saga 401 makes some arbitrary call into the service 404 to update the saga result as finished and/or completed.

Figure 5:
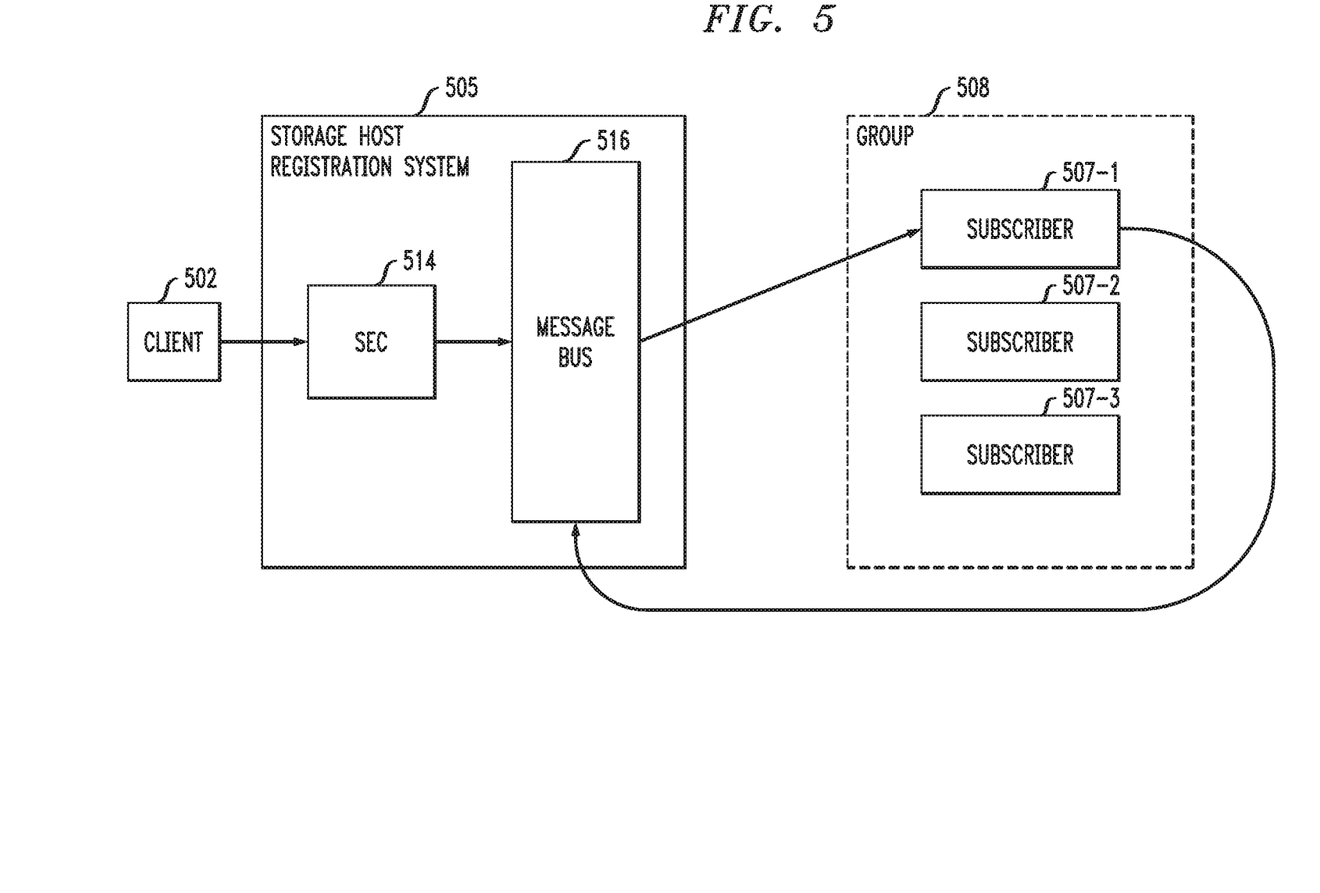
FIG. 5 shows a diagram illustrating horizontally scaling-out subscribers by leveraging subscriber grouping functionality of a message bus in an illustrative embodiment.

FIG. 5 shows a diagram illustrating horizontally scaling-out subscribers by leveraging subscriber grouping functionality of a message bus in an illustrative embodiment. By way of illustration, FIG. 5 depicts a sequence of actions taking place between client 502, SEC 514 and message bus 516 (as part of storage host registration system 505), as well as subscriber group 508, which includes subscriber 507-1, subscriber 507-2, and subscriber 507-3. Accordingly, in one or more embodiments, such as depicted in FIG. 5, a set of unique subscribers (e.g., subscriber 507-1, subscriber 507-2, and subscriber 507-3) may form a subscription group (e.g., group 508) for a specific topic. In such an embodiment, the grouping functionality of message bus 516 will load balance the delivery of topic messages to each subscription group member (e.g., subscriber 507-1, subscriber 507-2, and subscriber 507-3), for example, using a round-robin load balancing strategy.

As specifically depicted in the example embodiment of FIG. 5, client 502 makes a request into storage host registration system 505, ultimately handled by the SEC 514. SEC 514 then publishes a command message to message bus 516, and message bus 516 delivers the message exclusively to subscriber 507-1 in subscription group 508. The other members of the group 508 do not see the message. Further, as depicted by FIG. 5, subscriber 507-1 publishes a reply message to message bus 516.

Figure 6:
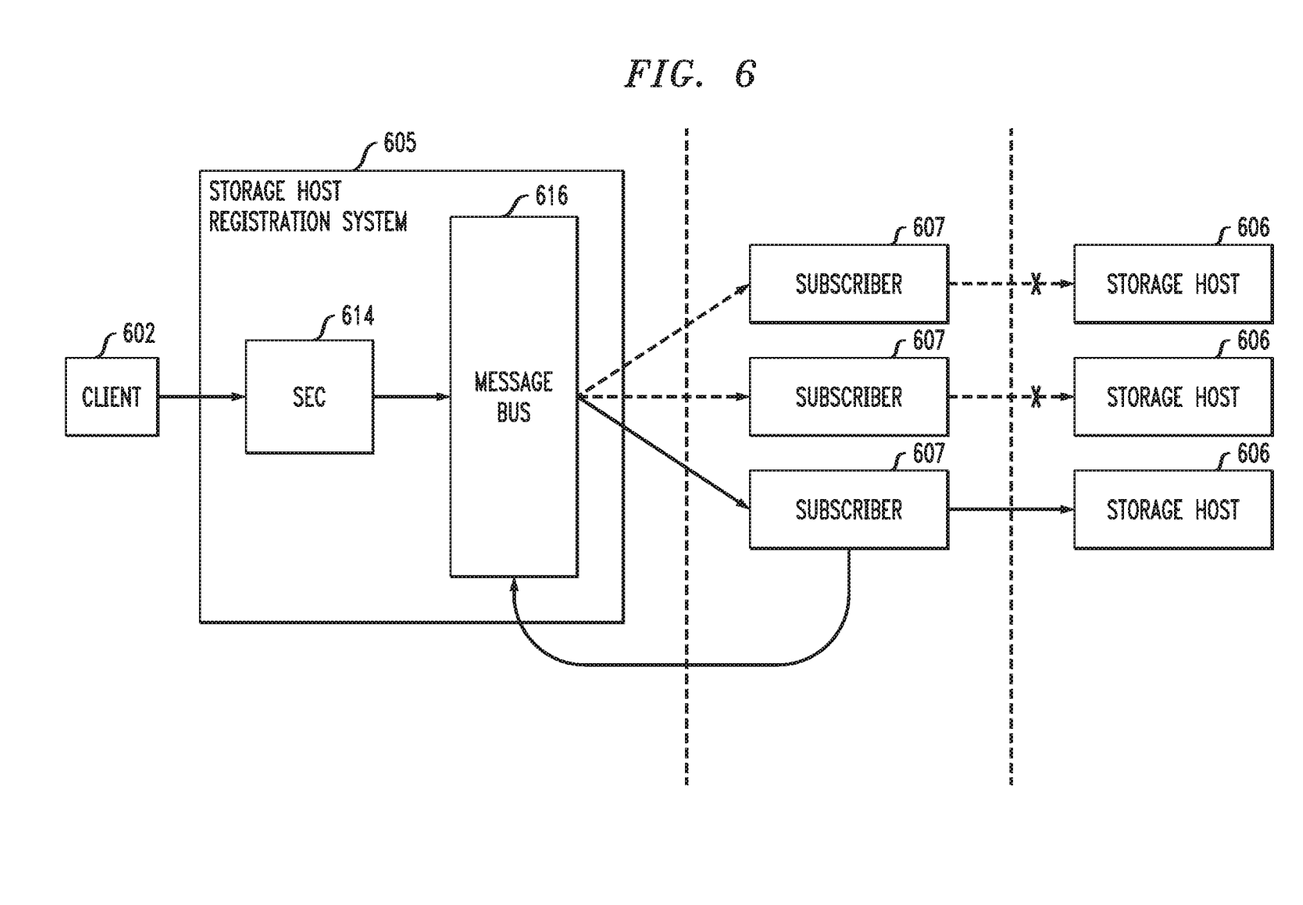
FIG. 6 shows leveraging of a message bus with at-least-once delivery guarantees to perform redelivery of command messages in the event of a non-critical error condition in an illustrative embodiment.

FIG. 6 shows leveraging of a message bus with at-least-once delivery guarantees to perform redelivery of command messages in the event of a non-critical error condition in an illustrative embodiment. By way of illustration, FIG. 6 depicts a sequence of actions taking place between client 602, SEC 614 and message bus 616 (as part of storage host registration system 605), subscriber 607, and storage host 606. A non-critical error condition may include, for example, a temporary network failure between an ISMP and a storage host being registered. Another example of a non-critical error can include, for instance, that the storage host is turned off or is otherwise in the process of establishing a connection to the network.

The example embodiment of FIG. 6 depicts a single subscriber 607 at distinct time intervals, each time interval representing an attempt to perform some action on a single storage host 606 (e.g., having a given IP address) via a command message. As illustrated in FIG. 6, the first and second attempts (shown by dashed lines/arrows) fail due to connectivity failures with the storage host 606, resulting in no acknowledgement being provided to the message bus 616 (via the subscriber 607). The third attempt (shown by solid lines/arrows) successfully connects the subscriber 607 to the storage host 606, allowing some action to be performed, resulting in an acknowledgement being sent to the message bus 616 (via the subscriber 607). The example embodiment depicted in FIG. 6 illustrates that the SEC 614 and the message bus 616, in combination, may provide for handling of transient failures. Specifically, in one or more embodiments, the SEC moves the responsibility of handling transient failures to the message bus. Consequently, this allows the SEC to focus its own implementation on business logic, and its asynchronous nature allows it to wait without taking up any system resources until it receives a reply. Alternative embodiments can include, for example, implementing a loop that periodically polls a resource for updates. Referring again to the example embodiment depicted in connection with FIG. 6, after any and/or all transient failures have been resolved, the registration process may eventually reach a successful terminal state.

Figure 7:
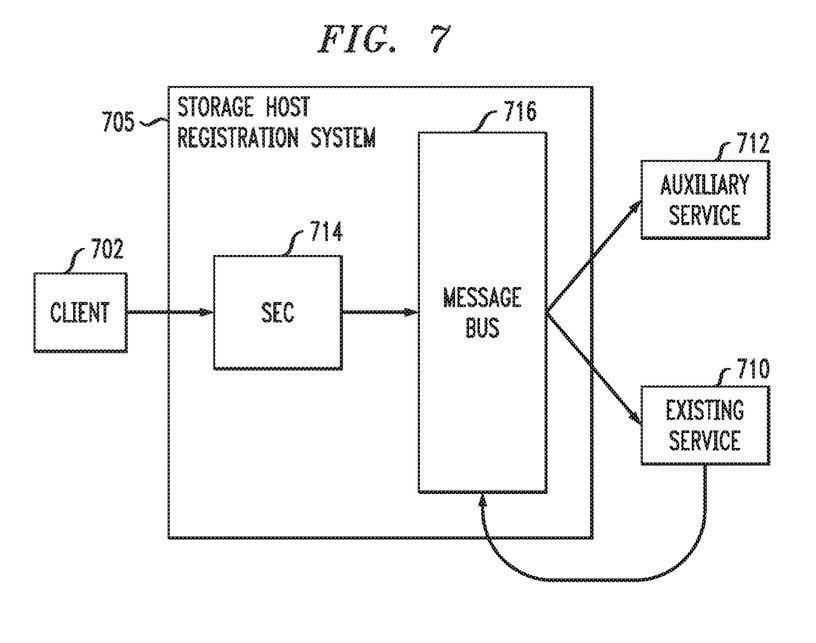
FIG. 7 shows loose coupling within a system in accordance with an illustrative embodiment.

FIG. 7 shows loose coupling within a system in accordance with an illustrative embodiment. By way of illustration, FIG. 7 depicts a sequence of actions taking place between client 702, SEC 714 and message bus 716 (as part of storage host registration system 705), existing service 710, and auxiliary service 712. As used herein, loose coupling refers to interconnecting components in a system such that the components depend on each other to the least extent possible, such as in connection with multiple interacting asynchronous processes. In one or more embodiments, a benefit of a loosely-coupled system can include, for example, that the system may be augmented without the need to change existing software components. As depicted in FIG. 7, auxiliary service 712 is added into a system, and one or more embodiments can include enabling loose coupling by not requiring any changes to existing service 710, therefore minimizing the dependencies and responsibilities of a service.

As specifically depicted in the example embodiment of FIG. 7, client 702 makes a request into storage host registration system 705, ultimately handled by the SEC 714. SEC 714 publishes a command message to the message bus 716, and message bus 716 delivers the message to subscriber auxiliary service 712 as well as to subscriber existing service 710. As also depicted in FIG. 7, existing service 710 publishes a reply message to message bus 716. As noted above and herein, benefits of loose coupling include being able to add arbitrary services by having the services subscribe to any messages of interest, thus keeping the implementations of the client and SEC simple and/or efficient.

Figure 8:
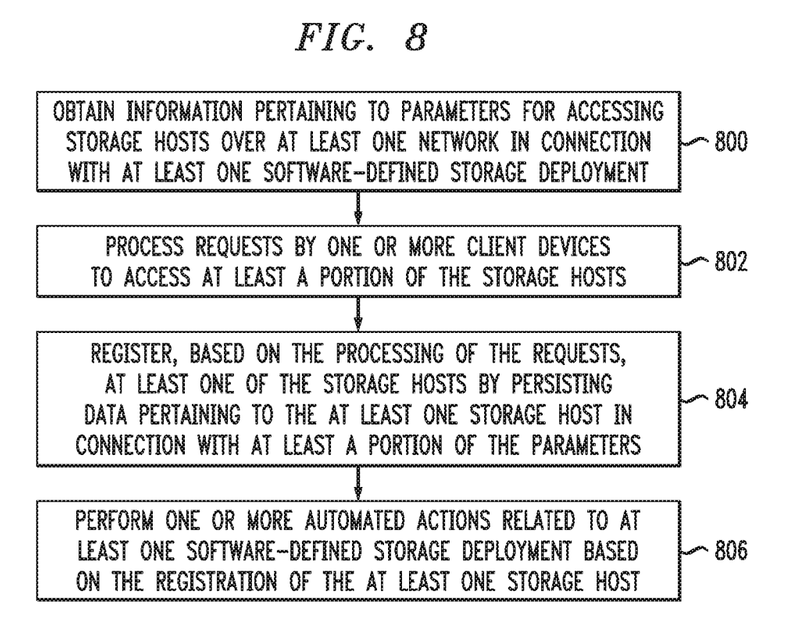
FIG. 8 is a flow diagram of a process for registering storage hosts for use in automating software-defined storage deployments in an illustrative embodiment.

FIG. 8 is a flow diagram of a process for registering storage hosts for use in automating software-defined storage deployments in an illustrative embodiment. It is to be understood that this particular process is only an example, and additional or alternative processes can be carried out in other embodiments.

In this embodiment, the process includes steps 800 through 806. These steps are assumed to be performed by the storage host registration system 105 utilizing its modules 112, 114, and 116.

Step 800 includes obtaining information pertaining to one or more parameters for accessing one or more storage hosts over at least one network in connection with at least one software-defined storage deployment. In one or more embodiments, the one or more storage hosts each include one or more data storage devices utilized in connection with at least one software-defined storage deployment.

Step 802 includes processing one or more requests by one or more client devices to access at least a portion of the one or more storage hosts. In at least one embodiment, processing the one or more requests includes delivering at least one message, directed to interest in a given topic, related to at least a portion of the one or more requests to at least one service, associated with the given topic, related to at least a portion of the one or more storage hosts. Such an embodiment can also include monitoring for acknowledgement of the at least one delivered message by at least one subscriber associated with at least a portion of the one or more requests. Additionally or alternatively, such an embodiment can include continuously performing delivery of the at least one message until receiving at least one receipt of acknowledgement from at least one subscriber associated with at least a portion of the one or more requests.

Further, in at least one embodiment, processing the one or more requests includes persisting information, derived from at least a portion of the one or more requests, pertaining to interest in one or more given topics for at least one of a defined subscriber and a defined group of subscribers.

Step 804 includes registering, based at least in part on the processing of the one or more requests, at least one of the one or more storage hosts by persisting data pertaining to the at least one storage host in connection with at least a portion of the one or more parameters. In at least one embodiment, registering the at least one storage host includes implementing at least one finite-state machine containing multiple states of a given storage host registration process flow. Additionally or alternatively, persisting data pertaining to the at least one storage host includes updating data pertaining to the at least one storage host within at least one operating system process (e.g., updating, in at least one database, at least one of a row of data specific to the at least one storage host and a column of data specific to the at least one storage host).

Step 806 includes performing one or more automated actions related to at least one software-defined storage deployment based at least in part on the registration of the at least one storage host. In at least one embodiment, performing the one or more automated actions includes automating one or more software-defined storage deployments using the registration of the at least one storage host.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to register storage hosts by automatically processing client requests and persisting data pertaining to the storage hosts and one or more access parameters. These and other embodiments can effectively overcome problems associated with error-prone and resource-intensive storage host preparation processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure, such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
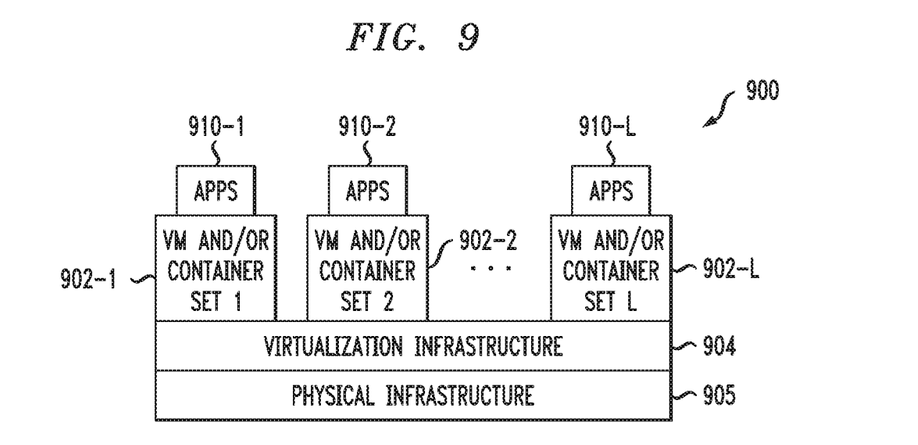
FIGS. 9 and 10 show examples of processing platforms that may be utilized to implement at least a portion of an information processing system in illustrative embodiments.
Figure 10:
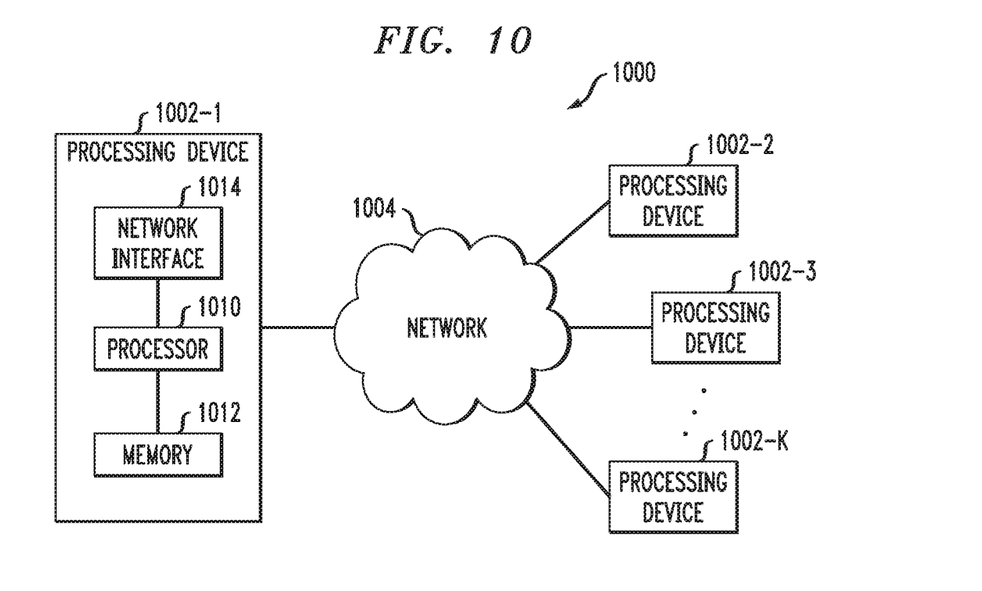

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an application-specific integrated circuit (ASIC), a field-programmable gate array (FPGA) or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining information pertaining to one or more parameters for accessing one or more storage hosts over at least one network in connection with at least one software-defined storage deployment;
   processing one or more requests by one or more client devices to access at least a portion of the one or more storage hosts;
   registering, based at least in part on the processing of the one or more requests, at least one of the one or more storage hosts by persisting data pertaining to the at least one storage host in connection with at least a portion of the one or more parameters, wherein persisting data pertaining to the at least one storage host comprises updating, in at least one database, at least one of a row of data specific to the at least one storage host and a column of data specific to the at least one storage host; and
   performing one or more automated actions related to at least one software-defined storage deployment based at least in part on the registration of the at least one storage host;
   wherein the method is performed by at least one processing device comprising a processor coupled to a memory.

2. The computer-implemented method of claim 1, wherein registering the at least one storage host comprises implementing at least one finite-state machine containing multiple states of a given storage host registration process flow.

3. The computer-implemented method of claim 1, wherein performing the one or more automated actions comprises automating one or more software-defined storage deployments using the registration of the at least one storage host.

4. The computer-implemented method of claim 1, wherein processing the one or more requests comprises delivering at least one message, directed to interest in a given topic, and related to at least a portion of the one or more requests to at least one service.

5. The computer-implemented method of claim 4, further comprising:
   monitoring for acknowledgement of the at least one delivered message by at least one subscriber associated with at least a portion of the one or more requests.

6. The computer-implemented method of claim 4, further comprising:
   continuously performing delivery of the at least one message until receiving at least one receipt of acknowledgement from at least one subscriber associated with at least a portion of the one or more requests.

7. The computer-implemented method of claim 1, wherein processing the one or more requests comprises persisting information, derived from at least a portion of the one or more requests, pertaining to interest in one or more given topics for at least one of a defined subscriber and a defined group of subscribers.

8. The computer-implemented method of claim 1, wherein the one or more storage hosts each comprise one or more data storage devices utilized in connection with at least one software-defined storage deployment.

9. A non-transitory processor-readable storage medium having stored therein program code of one or more software programs, wherein the program code when executed by at least one processing device causes the at least one processing device:
   to obtain information pertaining to one or more parameters for accessing one or more storage hosts over at least one network in connection with at least one software-defined storage deployment;
   to process one or more requests by one or more client devices to access at least a portion of the one or more storage hosts;
   to register, based at least in part on the processing of the one or more requests, at least one of the one or more storage hosts by persisting data pertaining to the at least one storage host in connection with at least a portion of the one or more parameters, wherein persisting data pertaining to the at least one storage host comprises updating, in at least one database, at least one of a row of data specific to the at least one storage host and a column of data specific to the at least one storage host; and
   to perform one or more automated actions related to at least one software-defined storage deployment based at least in part on the registration of the at least one storage host.

10. The non-transitory processor-readable storage medium of claim 9, wherein registering the at least one storage host comprises implementing at least one finite-state machine containing multiple states of a given storage host registration process flow.

11. The non-transitory processor-readable storage medium of claim 9, wherein performing the one or more automated actions comprises automating one or more software-defined storage deployments using the registration of the at least one storage host.

12. The non-transitory processor-readable storage medium of claim 9, wherein processing the one or more requests comprises delivering at least one message, directed to interest in a given topic, and related to at least a portion of the one or more requests to at least one service.

13. The non-transitory processor-readable storage medium of claim 9, wherein processing the one or more requests comprises persisting information, derived from at least a portion of the one or more requests, pertaining to interest in one or more given topics for at least one of a defined subscriber and a defined group of subscribers.

14. The non-transitory processor-readable storage medium of claim 9, wherein the one or more storage hosts each comprise one or more data storage devices utilized in connection with at least one software-defined storage deployment.

15. An apparatus comprising:
at least one processing device comprising a processor coupled to a memory;
the at least one processing device being configured:
to obtain information pertaining to one or more parameters for accessing one or more storage hosts over at least one network in connection with at least one software-defined storage deployment;
to process one or more requests by one or more client devices to access at least a portion of the one or more storage hosts;
to register, based at least in part on the processing of the one or more requests, at least one of the one or more storage hosts by persisting data pertaining to the at least one storage host in connection with at least a portion of the one or more parameters, wherein persisting data pertaining to the at least one storage host comprises updating, in at least one database, at least one of a row of data specific to the at least one storage host and a column of data specific to the at least one storage host; and
to perform one or more automated actions related to at least one software-defined storage deployment based at least in part on the registration of the at least one storage host.

16. The apparatus of claim 15, wherein registering the at least one storage host comprises implementing at least one finite-state machine containing multiple states of a given storage host registration process flow.

17. The apparatus of claim 15, wherein performing the one or more automated actions comprises automating one or more software-defined storage deployments using the registration of the at least one storage host.

18. The apparatus of claim 15, wherein processing the one or more requests comprises delivering at least one message, directed to interest in a given topic, and related to at least a portion of the one or more requests to at least one service.

19. The apparatus of claim 15, wherein processing the one or more requests comprises persisting information, derived from at least a portion of the one or more requests, pertaining to interest in one or more given topics for at least one of a defined subscriber and a defined group of subscribers.

20. The apparatus of claim 15, wherein the one or more storage hosts each comprise one or more data storage devices utilized in connection with at least one software-defined storage deployment.

* * * * *